April 14, 1970 H. E. GRAHAM 3,505,783
HEATLESS DRYING SYSTEM
Filed Sept. 27, 1967
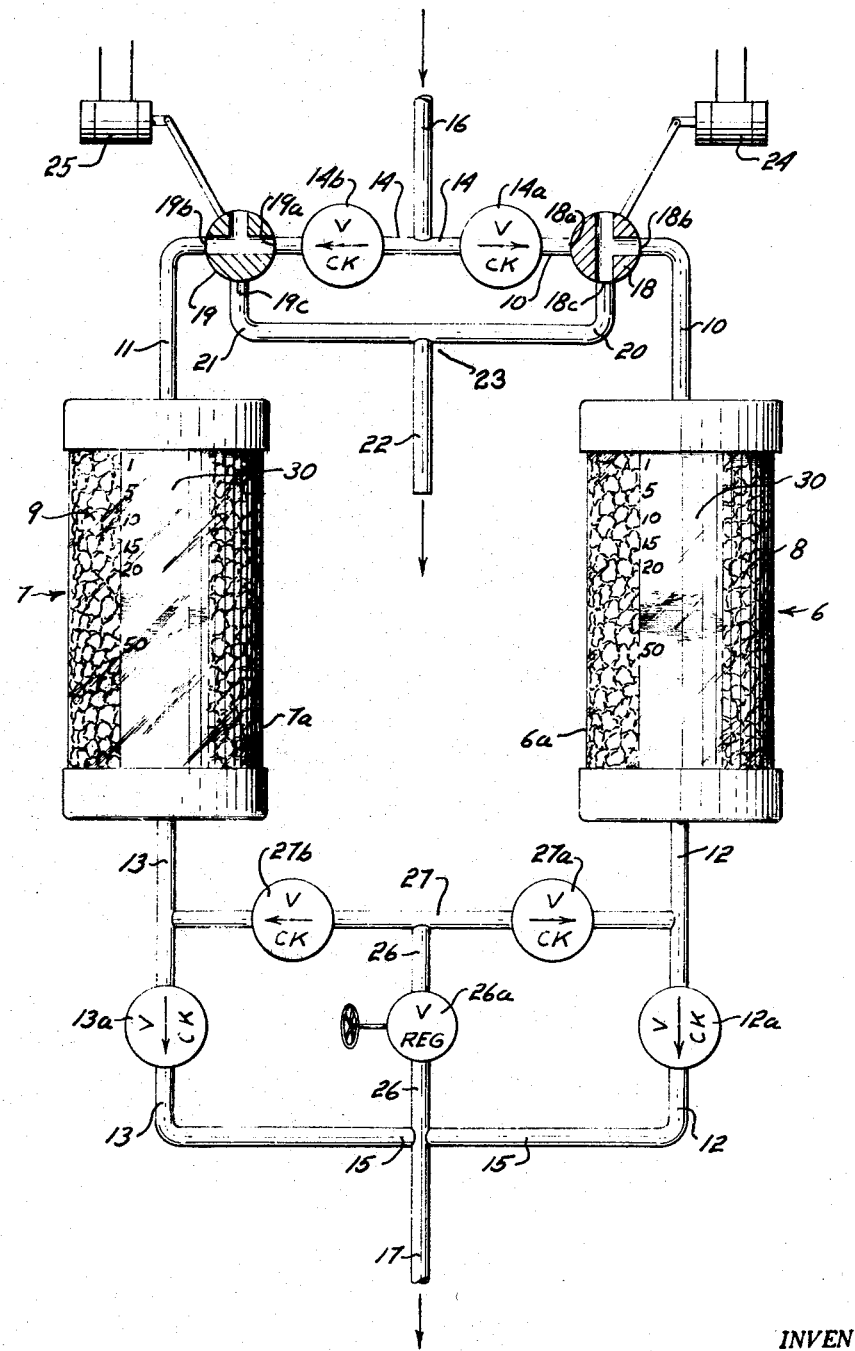
INVENTOR.
HAROLD E. GRAHAM
BY
Synnestvedt & Lechner
ATTORNEYS

# United States Patent Office

3,505,783
Patented Apr. 14, 1970

3,505,783
HEATLESS DRYING SYSTEM
Harold E. Graham, Wilmington, Del., assignor to Deltech Engineering, Inc., New Castle, Del., a corporation of Delaware
Filed Sept. 27, 1967, Ser. No. 670,980
Int. Cl. B01d 53/00
U.S. Cl. 55—33          8 Claims

ABSTRACT OF THE DISCLOSURE

Method and apparatus for controlling the degree of dryness of gas, e.g. air, in a heatless drying system. The use of a color indicator within each of a pair of drying beds provides a means of determining the relative position of the humidity gradients in the two beds. The color indicators provide useful control parameters for assuring that the gas is being properly dried.

DISCLOSURE

This invention relates to improvements in air drying and in similar fractionating or separating operations wherein one or more components are removed from a gas stream. In particular, this invention relates to methods and apparatus useful in "heatless" drying systems.

An important disclosure relating to the field of heatless drying is found in Skarstrom Patent 2,944,627. The present invention is particularly adapted for use in the apparatus and methods disclosed in Patent 2,944,627, and in some respects may be regarded as an improvement on the teaching of that patent. The following explanation of the invention will therefore be presented principally in the context of a system generally following the teachings of Skarstrom Patent 2,944,627.

A detailed description of the means and processes by which heatless drying and similar operations are carried out is found in above-mentioned Patent 2,944,627 and also in Skarstrom Patent 3,082,166, and for this reason it is unnecessary to give a detailed description of the basic principles involved in such drying here. However, these principles can be briefly outlined. In such an operation, the gas to be dried, commonly air, is passed through an apparatus having two adsorbent beds arranged in parallel. The piping and valving in such an apparatus is arranged so that the gas being dried can be alternately passed through one or the other of the two adsorbent beds selectively. By appropriate timing apparatus the gas flow can be switched from one bed to the other in a regular cycle. The gas stream is normally fed to the bed under relatively high pressure. While there is inevitably some pressure drop across the bed, the dried gas stream at the output end of the bed is nonetheless still under relatively high pressure.

While one of the adsorbent beds is being utilized to scrub water from the air being passed through it under pressure, the other bed of the pair is being regenerated at relatively low pressure. This is accomplished by using a portion of the air which has already been dried to dry the adsorbent material in the bed which is off stream at the time. Because of the variation in water holding capacity of air per unit weight at various pressures, a relatively small amount of the dry air at a lower pressure is required to regenerate an adsorbent bed in each cycle.

As wet high pressure air is passed through one of the adsorbent beds, the bed tends to become progressively saturated. Once a bed is in operation a humidity gradient will exist from one end to the other with the inlet end of the bed being highly saturated and the outlet end being practically dry. This gradient gradually changes as the bed becomes progressively more saturated and for simplicity of illustration, there may be said to be a line or front which is at a given degree of saturation starting at the upstream end of the bed and moving toward the downstream end. Similarly as an adsorbent bed is regenerated or dried by backflow of dry low pressure air through it, this line, termed a "line of saturation" hereinafter, tends to move back up the bed. The flow of gas to be dried and the flow of regenerating recycle gas, are simultaneously switched between the two beds on a cycle which is relatively short in duration.

The present invention is based on the discovery that the moisture content of the dry air can be regulated through use of the color indicator materials which are capable of providing the operator with a progressive indication of the degree to which the bed is saturated. By the selection of a suitable indicator, a line or band of color demarcation, where one primary color changes to another primary color is visible enough to be easily detected by the operator. This line will move up and down along the bed according to changes in the moisture content of the particles in the bed. The location of this line of demarcation is thus a control parameter with which the relative humidity of the air being dried can be controlled.

Although the line of color demarcation will probably always oscillate slightly as the bed is alternately used and then regenerated, it is preferred practice that the cycle of operation will be such that the line will be held in a substantially stable or steady position. As a practical matter, when preferred techniques are employed, changes in the position of the line of demarcation cannot be detected.

It is therefore an object of the present invention to provide an improved heatless drying or separating system, and in particular to provide such a system which is more easily controlled than those heretofore used.

It is a related object of the present invention to provide a new method for controlling product quality in a heatless drying system.

A more specific object of the invention is to exploit the color indicator properties of various materials which are exposed to the air in a heatless drying chamber to adjust other control variables to obtain a dried product having the desired properties, and to do so on a substantially continuous basis if desired.

It is also an object of this invention to provide improved apparatus for heatless drying which is specially constructed to make possible the exploitation of a color change indicator as a means of control of final product quality.

The foregoing objects, together with other objects, may be more readily understood by considering the detailed description which follows together with the accompanying drawing in which a heatless drying system according to the invention is shown somewhat diagrammatically.

For purposes of illustration, the device shown in the drawing is arranged to operate on the basic cycle taught in above-mentioned Skarstrom Patent 2,944,627. The unit includes a pair of adsorbent beds 6 and 7, each of which include cylindrical walls 6a and 7a and formed of a transparent plastic such as an acrylic. The beds are filled with an adsorbent material indicated at 8 and 9. Piping and valving are associated with the beds to provide for wet air input through conduit 16, dry air output through conduit 17, and purge air output through conduit 22. The piping and valving so provided includes an inlet manifold conduit 14, at one end of which is a conduit 10 leading to adsorbent bed 6, and at the other end of which is conduit 11 leading to adsorbent bed 7. Inlet conduit 16 is connected to manifold conduit 14 at about the center thereof. The manifold conduit 14 has mounted on it on either side of input conduit 16 a pair of three-port flow-switching valves designated 18 and 19. In addition the inlet manifold 14 has mounted in it a pair of check valves 14a and 14b which, as can be seen on the figure, are positioned respectively between inlet conduit 16 and valve 18, and between inlet conduit 16 and valve 19.

As was mentioned above, valves 18 and 19 are three-port valves. Connected to one of the ports of each valve are discharge conduits, conduit 20 being provided for valve 18 and conduit 21 being provided for valve 19. These in turn are connected to a common discharge conduit 22 through which, as has been mentioned, purge air is discharged. Valves 18 and 19 are preferably automatically operated on a preselected time cycle, by timing equipment which is not shown. The timing equipment operates solenoids 24 and 25 to move the valves between two positions; valve 18 is shown in one position, while valve 19 is shown in the other position.

The normally downstream ends of adsorbent beds 6 and 7 are connected by means of conduits 12 and 13 to an output manifold conduit 15. Output conduit 17 is connected to manifold conduit 15, and it is through conduit 17 that the dried product gas leaves the apparatus. Also connected to manifold conduit 15 is a purge stream conduit 26. Conduit 26 has mounted in it a flow regulator 26a. Purge conduit 26 is connected to cross conduit 27, one end of which is connected to conduit 12 and the other end of which is connected to conduit 13. A check valve 12a is mounted in conduit 12 downstream from the connection of the manifold conduit 27. Similarly, check valve 13a is mounted in conduit 13 downstream from the connection of conduit 27 and upstream from the connection of manifold conduit 15. Cross conduit 27 has a pair of check valves 27a and 27b in it, one on either side of the connection of purge conduit 26 to conduit 27. The checking directions for all of the check valves just mentioned are conventionally indicated on the drawing.

The operation of the apparatus so far described is as follows. For convenience, the three ports of valve 19 are designated in the drawing as 19a, b, and c, and the three ports of valve 18 are similarly designated 18a, b, and c. With the apparatus arranged as shown in the figure, compressed air to be dried is introduced through conduit 16. It passes through check valve 14b to valve 19. Valve 19 is positioned so that ports 19a and 19b are in communication with one another but not with 19c. (Input gas does not move through valve 18, because that valve is positioned so that port 18a is not in communication with any other port.) The input gas moves from valve port 19b through line 11 into adsorbent bed 7. It leaves bed 7 at the lower end thereof through line 13. The dried gas leaving through line 13 cannot flow through line 27 because it is blocked by check valve 27b. The dry gas flows from line 13 into manifold conduit 15 and ultimately leaves the apparatus through outlet conduit 17. The gas flowing through conduit 15 cannot flow through line 12 because it is blocked by check valve 12a. The bulk of the dry air thus leaves the unit through outlet conduit 17. The remainder of the dry air passes through conduit 26. This portion of the dry air passes through flow regulator 26a which serves to control the flow of purge air. After passing through the flow regulator, the dry air passes into line 27. It will, of course, tend to flow in both directions in line 27. However, its flow to the right in that line is blocked at check valve 27b, because the higher pressure air to the right of check valve 27b holds that valve in a closed position. The air in line 27 can successfully flow through check valve 27a into conduit 12. It flows into conduit 12 and thence in adsorbent bed 6. The dry gas from line 27 cannot flow through check valve 12a, because the higher pressure gas in the lower part of line 12 holds check valve 12a in a closed position.

From the foregoing it can be seen that substantially all of the dry air which passes through pressure regulator 26a is delivered to the end of adsorbent bed 6. This air passes adsorbent bed 6 and in doing so, tends to dry or purge the adsorbent contained therein. This purge air stream then passes out of adsorbent bed 6 through conduit 10, which conducts it to manifold conduit 14. It flows through this conduit to port 18b of valve 18, and with the valve 18 positioned as shown in the drawing, leaves the valve at port 18c. It then flows through conduit 20, manifold 23, and leaves the apparatus through outlet conduit 22.

In the operation just described, adsorbent bed 7 is removing water from high pressure air flowing through it and adsorbent bed 6 is being regenerated by a purge stream consisting of a portion of the product from adsorbent bed 7 passing through it. As the operation continues in this manner, the adsorbent material 9 in bed 7 tends to become more heavily loaded with water, and thus less capable of scrubbing water from the air passing through it, while adsorbent bed 6 becomes drier as a result of the low pressure dry purged air passing through it.

It is possible, of course, to continue the operation just described until the working absorbent bed (bed 7) is substantially saturated. However, in practicing my invention, the flow pattern is preferably reversed, so that wet high pressure air is passed through bed 6 and purged air is passed through bed 7, before the humidity gradient or saturation line on stream in the bed moves appreciably, and preferably before any such movement is observable. When the apparatus is operated in this manner, it will be found that the relative moisture content in the product air (that leaving through conduit 17) can be made to assume a relatively stable value, assuming, of course, that all other conditions remain constant.

The moisture content of the product air in a system of the kind just described is a function of a number of variables. Some of these are more or less fixed in the course of design of the apparatus, such variables including the kind and quantity of adsorbent material in the beds. Other variables result from conditions external to the apparatus. These include the pressure, temperature, moisture content and flow rate of the air fed to the apparatus. Still other variables are internal to the apparatus, and these variables are most readily adjusted in order to produce product air having the desired moisture content. The principal variables of this nature are the pressure and volume of the purge air, in relation to the pressure and volume of air being dried, and the cycle time.

When a color indicator is used in the adsorbent beds just described, a visible band of color demarcation is formed between the region of a bed which is heavily loaded with water, and the region of the bed whose water holding capacity is mostly unused.

I have found that the position of the band can be held quite stationary by alternately using and partially regenerating the beds at predetermined intervals and when the bands in both beds are held stationary and in substantial alignment, the moisture content of the output air remains quite constant.

If a change in conditions occurs, the moisture content in the product air will obviously change and the location of the band of color and demarcation also tends to change. It will move up or down the bed depending on the kind of change in conditions which has occurred. Such a change in the position of the color band can be easily noted by an operator of the equipment, and provides him with an indication of the change in moisture content of the product air, and an indication of the direction of change in time to adjust the process variables. Thus the operator is provided with a means for determining what variables should be altered to return the moisture content of the product air to the desired level and an indication of how much such variables should be altered. When the operator sees the color band returned to its original position, he knows that the moisture content of the product air has been restored to its original level also.

The common disruptive changes in conditions which tend to alter the moisture content of the product air occur in the external variables mentioned above. That is to say, variations in pressure, temperature, flow rate and moisture content of the input air commonly occur. Another kind of change which commonly occurs is in the level of moisture which is desired in the product air. The variables which are altered to compensate for change in external conditions are those internal to the apparatus, such as the cycle time, volume or flow rate of the purge air. Except for cycle time, these may be changed (in an interrelated manner) by adjustment of flow regulator 26a. Thus, in a controlled operation in accordance with the invention, the operator will observe and note the position of the color band or line in the bed which is on stream, and will adjust the flow regulator 26a in response to changes in the location of the band. The closer the band is to the normal output end of a bed, the higher the moisture content of the product air will be.

The precise location of the color band will, of course, depend on all of the variables discussed above in a particular system. Nonetheless, most systems will be designed to handle an optimum flow rate of air at an optimum pressure, and steps can be taken to provide air supply equipment which furnishes air to the unit at reasonably constant pressure and flow rate. The variables which are least susceptible to stabilization are the temperature and moisture content of the input air, and thus in a typical operation it is these external variables which will tend to cause variations in the moisture content of the product air and in the location of the color line. A correlation or calibration between the moisture content of the product air and the linear position of the color line in the bed can be readily obtained, and good control of product air moisture content can be obtained by observing the location of the bands and adjusting variables to stabilize them in the desired location.

The particular adsorbent used in a bed operated in accordance with the invention is a matter of choice. Well known adsorbents which are suitable include silica gel, activated alumina, and molecular sieves. The particular reversible indicators used are also a matter of choice. Typical examples are cobalt chloride and cobalt bromide.

Although the adsorbent may be impregnated with the indicator material so that the bed itself changes color as its humidity gradient changes, it is preferred that paper strip 30 typically impregnated with a cobalt chloride indicator be positioned within the vessels housing the bed. The strips are bathed by the air as it flows through the beds and when any portion of a strip reaches a predetermined degree of saturation, that portion will change color.

The strips are visible through the acrylic side walls so they can be readily viewed by the operator and are preferably provided with scales graduated to indicate to the operator the degree of saturation of the bed or relative humiidty of the output air.

Preferably the color indicator should not change color at too low or too high a relative humidity. Change at too low a value may result in the stable position of the color band actually lying beyond the outlet end of the bed under some conditions whereas color change at a value approaching 100% relative humidity results in such a small change in the position of the band of color demarcation even when the relative humidity of the exit air varies substantially as to render it useless as a control parameter. In actual practice, indicators which change color at values of about 40% to 60% relative humidity work quite satisfactorily for the control of moisture contents of output air typically ranging from about 1% to 20% relative humidity.

When changes in the output air moisture content are desired the operator merely adjusts process variables until the desired new level of color demarcation is reached in each of the beds. This is usually accomplished by adjusting valve 26a to adjust the quantity of recirculating air delivered to the beds.

The unique color indication feature of the invention provides continual assurance that the air or other gas is properly dried and provides for an extremely simple method of control of the unit. An important feature of the invention arises from the fact that air consumed for reactivation or regeneration of partially saturated beds can easily be adjusted to meet variations in process requirements, air flows, operating pressure and seasonal temperatures. Operating costs can be substantially reduced because the amount of air consumed for regeneration or purging can be readily adjusted. Adjustment of operation, as for example during warm weather when more moisture in the product air can be tolerated, can be readily accomplished simply by adjusting the amount of recirculating air.

I claim:

1. A method for controlling a heatless dryer system of the kind employing a pair of adsorbent beds through which gas to be dried is alternately passed in a regular cycle at a relatively high pressure and in which one of said beds is regenerated by the backflow of a portion of the product gas through it at relatively low pressure while the other bed is drying the gas to be dried, said method comprising: incorporating a color chnge indicator in each bed, said color change indicator providing a band of color demarcation which moves along said bed in relation to changes in the humidity gradient within the bed, observing the position of the band of color demarcation in each bed during gas drying operations, and regulating the porportion of product gas used for regeneration purposes to maintain said bands in substantially steady state positions, thereby creating product gas of substantially uniform relative humidity.

2. In a method for heatless drying of gas by the use of a pair of adsorbent beds through which said gas is alternately passed in a regular cycle, and in which a portion of the dried product gas is used to regenerate the adsorbent bed of said pair which is offstream at any moment in a cycle by being backflowed through it at reduced pressure, the improvement which comprises: utilizing a color change indicator in said adsorbent beds responsive to changes, in the local relative humidity of the adsorbent material in said beds, thereby creating a movable band of color demarcation in each of said beds when in use and when being regenerated, varying the operating conditions of said system with time to produce product gas having varying moisture content, measuring the moisture content of said product gas at selected times during said variation of operating conditions, observing the location of said bands of color demarcation at each moisture content measurement during said variation of operating conditions, thereafter stabilizing operating conditions to position said bands of color demarcation at a location corresponding to the desired moisture content of product gas, and thereafter maintaining the location of said color bands stable by varying at least one operating condition when any other operating condition varies sufficiently to tend to change the location of said color bands.

3. A method in accordance with claim 2, in which the operating condition which is varied to maintain the location of said color lines stable is the proportion of dried product gas used for regeneration purposes.

4. In a heatless dryer apparatus for heatless drying of gas including a pair of columnar adsorbent beds, conduit means for alternating a flow of gas to be dried to one and then the other of said beds, said conduit means further being arranged to circulate a portion of the dried gas through the bed not being used in order to dry the bed, the improvement which comprises a calibrated color change indicator placed within each bed, said color change indicator being disposed within each bed to provide a band of color demarcation movable lengthwise of the bed upon changes in the localized relative humidity in the bed, and transparent wall portions for each of said beds, said transparent wall portions providing for viewing of said bands of color demarcation.

5. Apparatus according to claim 4, further including indicia extending lengthwise of each bed, said indicia cooperating with said bands of color demarcation for indicating the relative humidity of the output gas.

6. Apparatus according to claim 4, wherein each of said color change indicators comprises a paper strip extending lengthwise of the bed in contact with the gas being dried, said strip being impregnated with a color change indicator material.

7. Apparatus according to claim 6, wherein said color change indicator material is cobalt chloride.

8. In a heatless dryer apparatus for heatless drying of gas, a pair of columnar adsorbent beds have identical diameters and identical capacities, and being filled with substantially equal amounts of moisture adsorbent material, conduit means for alternating a flow of gas to be dried to one and then the other of said beds, said conduit means further being arranged to circulate a portion of the dried gas through the bed not being used at a relatively low pressure with respect to the pressure of the gas being dried in order to dry the bed, a calibrated color change indicator comprising a paper strip coated with a color change indicator material disposed in each of said beds and extending lengthwise thereof, and a transparent wall portion in said beds for viewing said color change indicators, said color change indicators providing bands of color demarcation movable with changes in the positions of the relative humidity gradients in the beds, and flow regulator means in said conduit means for regulating the proportion of dried gas being circulated through the bed not being used, said flow regulator means being operable to maintain said bands of color demarcation substantially stationary and in substantial alignment with each other.

References Cited

UNITED STATES PATENTS

| | | | |
|---|---|---|---|
| 2,575,234 | 11/1951 | Race | 55—275 |
| 2,703,628 | 3/1955 | Pompeo et al. | 55—179 |
| 2,944,627 | 7/1960 | Skarstrom | 55—62 |

REUBEN FRIEDMAN, Primary Examiner

C. N. HART, Assistant Examiner

U.S. Cl. X.R.

55—275